(12) United States Patent
Ichikawa

(10) Patent No.: US 6,727,203 B2
(45) Date of Patent: Apr. 27, 2004

(54) METHOD FOR PRODUCING MICROCAPSULES AND HEAT-SENSITIVE RECORDING MATERIAL

(75) Inventor: Kimio Ichikawa, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 82 days.

(21) Appl. No.: 10/072,950

(22) Filed: Feb. 12, 2002

(65) Prior Publication Data

US 2002/0142915 A1 Oct. 3, 2002

(30) Foreign Application Priority Data

Mar. 28, 2001 (JP) ........................................ 2001-093821
Mar. 28, 2001 (JP) ........................................ 2001-093822

(51) Int. Cl.$^7$ ................................................ B41M 5/30
(52) U.S. Cl. ..................... 503/215; 424/423; 424/450; 424/489; 428/402.2; 428/402.21; 428/402.22; 503/213
(58) Field of Search ................................. 503/213, 215; 428/402.2, 402.21, 402.22; 424/489, 423, 450

(56) References Cited

U.S. PATENT DOCUMENTS

| | | | | |
|---|---|---|---|---|
| 5,792,472 | A | * | 8/1998 | Roux et al. .................. 424/450 |
| 6,099,864 | A | * | 8/2000 | Morrison et al. ........... 424/489 |
| 6,509,296 | B1 | * | 1/2003 | Lelental et al. ............. 503/212 |

FOREIGN PATENT DOCUMENTS

| | | |
|---|---|---|
| JP | 6-297856 | 10/1994 |
| JP | 2630501 | 4/1997 |
| JP | 11-512645 | 11/1999 |
| JP | 11-514573 | 12/1999 |
| JP | 2000-503894 | 4/2000 |
| JP | 2000-509330 | 7/2000 |

OTHER PUBLICATIONS

Wolfgang Ehrfeld, Volker Hessel, Holger Lowe, "Microreactors", New Technology for Modern Chemistry, WILEY–VCH, Weinheim–New York–Chichester–Brisbane–Singapore–Toronto.

* cited by examiner

Primary Examiner—B. Hamilton Hess
(74) Attorney, Agent, or Firm—Sughrue Mion, PLLC

(57) ABSTRACT

A method capable of producing, with industrially realizable production efficiency, microcapsules whose particle diameters are small and whose particle diameter distribution is limited, specifically microcapsules for a heat-sensitive recording material, and a heat-sensitive recording material including the thus produced microcapsules. In this method, microcapsules are produced by the steps of preparing an emulsion from an oil phase that contains a material to be micro-encapsulated and a microcapsule wall material, and an aqueous phase, and micro-encapsulating the materials by using the emulsion, the emulsion preparing step being conducted by using a microreactor having channels whose equivalent diameter is no more than 1 mm, and a heat-sensitive recording material having the thus obtained microcapsules is also provided.

20 Claims, No Drawings

METHOD FOR PRODUCING MICROCAPSULES AND HEAT-SENSITIVE RECORDING MATERIAL

BACKGROUND OF THE INVENTION

1. Field of the Invention

The present invention relates to a method for producing microcapsules, and more particularly to a method for producing microcapsules for use in a heat-sensitive recording material. The present invention also relates to the heat-sensitive recording material.

2. Description of the Related Art

Various methods for producing microcapsules are known, and among these methods, there is a method in which a material to be micro-encapsulated and a material used for a microcapsule wall are dissolved in an organic solvent, then added to water in which a water-soluble high polymer has been dissolved, and then mixed. This mixture is emulsified into finer particles by using emulsification means such as a high-speed stirrer (dissolver), a homogenizer, or an inline mixer thus obtaining a stable emulsion. Afterwards, a microcapsule wall is formed from the material for the microcapsule wall. As the microcapsule wall, polyurethane and/or polyurea in which polyol and/or polyamine and polyisocyanate are mixed are well known.

A heat-sensitive recording material is known as a recording material using such microcapsules. For example, Japanese Patent Application Laid-Open (JP-A) No. 6-297856 discloses such a heat-sensitive recording material. In this disclosure, in order to emulsify a coupler and a basic substance, these compounds are dissolved in an organic solvent. An aqueous solution of the water-soluble high polymer is added to this mixture while being stirred by a homogenizer.

In the emulsification means such as the high-speed stirrer (dissolver), the homogenizer, or the inline mixer which are described above and which are used in the step of producing microcapsules, a region to which shearing force required for emulsification is applied is limited to the immediate vicinities of emulsification wings. For this reason, there has been caused a problem that the shearing force is not applied uniformly to portions that are apart from or close to the emulsification wings, thus causing the particle diameter distribution of dispersed droplets to be large.

In the heat-sensitive recording material, the particle diameter distribution of microcapsules is desired to be limited so as to form a balanced relationship between heat-sensitivity characteristics and a so-called textile fogging. Since the particle diameter distribution of the microcapsules depends on that of droplets contained in the emulsion during the step of producing the microcapsules, an emulsification method must be used in which the particle diameter distribution of droplets is limited.

With respect to this, as an emulsification method for solving the problem of the particle diameter distribution through the use of the above-described emulsification means, JP-A No. 2630501 discloses an emulsification method in which a so-called "cylindrical mill" is used. In this emulsification method, the inner cylinder is rotated inside the fixed outer cylinder to pass the mixture of a dispersion solvent and a dispersion through a space between the inner cylinder and the outer cylinder to thereby obtain an emulsion. The mixture is supplied from a tangent direction side surface end portion of the outer cylinder along the circumference thereof. While the mixture is rotated to move into the space between the inner cylinder and the outer cylinder, uniform shearing force is applied to the inner cylinder in the lengthwise direction thereof so that the mixture can be emulsified sufficiently. By this emulsification method, an emulsion whose particle diameter distribution is extremely limited can be obtained. However, since the size of particle diameters of the droplets thus obtained depends on the size of the space between the inner cylinder and the outer cylinder, it is not easy to obtain emulsified particles having no more than a limited particle diameter. Therefore, the particle diameter of the droplets thus obtained is generally limited to about 10 $\mu$m, thus making it impossible to obtain droplets whose particle diameters are no more than a few $\mu$m.

From a viewpoint of heat color formation characteristics, especially of controlling preferable color formation gradation, microcapsules used for the heat-sensitive recording material needed to have limited particle diameter distribution as described above and to have particles whose particle diameters are generally a few $\mu$m or less, and more preferably 1 $\mu$m or less. Therefore, it is difficult to adopt an emulsification method using the cylindrical mill. On the contrary, it is desirable to adopt an emulsification method by using microcapsules whose particle diameters are 1 $\mu$m or less and whose particle diameter distribution is limited.

A device i.e., a so-called microreactor has been used in a fine chemical field or a biochemical field, and in recent years, has made much progress (see W. Ehrfeld, V. Hessel, and H. Lowe, "Microreactor", 1Ed. (2000), WILEY-VCH). The microreactor generally refers to a reactor having microscaled channels. For example, while two types of solutions pass through different channels, these solutions come into contact with each other in a form of an extremely thin membrane, in which substances transfer via the interface between layers, and then react with each other. Further, the microreactor is utilized not only for chemical reactions but also for mixing or separating two or more different solutions. Specifically, the microreactor used for mixing is called a "micromixer". The micromixer mixes these different solutions by the steps of forming liquid films of these different solutions which are to be mixed such that the films are superposed, and passing the liquid films through narrow passages. For example, by using the oil phase and the aqueous phase as liquids, an emulsion can be prepared.

WO00/62913 proposes a dispersion device (micromixer) for conducting dispersion by using such a microreactor. This dispersion device is used by a method in which fluids which are formed of liquid A and liquid B are passed through respective microscaled channels and then divided into spatially separate liquid layers (liquid films). Then, the separate fluids are combined with each other, passed through narrow passages, and the liquid A and the liquid B are dispersed into fine droplets, during which a mechanical oscillator is used to promote the formation of droplets.

However, in the emulsification step for producing microcapsules, especially that used for the heat-sensitive recording material, a technique for conducting emulsification by means of a microreactor, and for producing microcapsules having a target particle diameter and a target particle diameter distribution is not known. This is because of the below described reason. Namely, in the production of microcapsules, during the emulsification step, a water-soluble high polymer compound is usually added to an aqueous phase to be added to an oil phase for stabilizing the dispersion of droplets. However, the aqueous solution to which the water-soluble high polymer compound was added has a high viscosity, thus making it impossible to increase the processing amount from a viewpoint that pressure loss is likely to occur inside the micromixer. Further, emulsification cannot usually be carried out without adding the water-soluble high polymer compound to the aqueous phase.

SUMMARY OF THE INVENTION

An object of the present invention is to provide a method for producing microcapsules whose particle diameters are small and whose particle diameter distribution is limited, with industrially realizable production efficiency, specifically microcapsules used for a heat-sensitive recording material, and the heat-sensitive recording material containing microcapsules produced through the use of this method.

The object can be achieved by providing a method for producing microcapsules and a heat-sensitive recording material described below.

A first aspect of the present invention is a method for producing microcapsules comprising the steps of: (1) preparing an emulsion from an oil phase that contains at least a material to be micro-encapsulated and a microcapsule wall material, and an aqueous phase; and (2) carrying out micro-encapsulation by using the emulsion, wherein the step of preparing the emulsion is conducted by means of a microreactor having channels whose equivalent diameters are no more than 1 mm.

A second aspect of the present invention is a method for producing microcapsules, comprising the steps of (1) preparing an emulsion from an oil phase that contains at least a material to be micro-encapsulated and a microcapsule wall material, and an aqueous phase; and (2) carrying out micro-encapsulation by using the emulsion, wherein the aqueous phase contains at least a surface active water-soluble high polymer compound and has a viscosity of no more than 40 cp, and the step of preparing the emulsion is conducted by means of a microreactor having channels whose equivalent diameters are no more than 1 mm.

A third aspect of the present invention is a heat-sensitive recording material having a heat-sensitive recording layer on a support, wherein the heat-sensitive recording layer contains microcapsules obtained by the method for producing microcapsules, and a color-developing agent.

DESCRIPTION OF THE PREFERRED EMBODIMENTS

A microreactor used in the present invention is a reactor having microscaled channels (see W. Ehrfeld, V. Hessel, and H. Lowe, "Microreactor", 1Ed. (2000), WILEY-VCH for further details).

Since the channels of the microreactor are microscaled, both the size and the flow rate thereof are small and Reynolds number is no more than 200. Accordingly, a reactor having microscaled channels is not a device which is controlled by turbulent flow like in an ordinary reactor but a device which is controlled by laminar flow.

In those devices controlled by laminar flow, even when flows of two solutions are made to contact with each other, the two solutions can be mixed only by diffusion via the interface therebetween. Since a microscaled space has a large specific interface area, the space can be advantageously used for diffusion mixing at the interface at which larminar flows come into contact with each other. The time the diffusion mixing takes depends on a sectional area of the interface at which the two solutions contact with each other, and a thickness of a solution layer. In accordance with "diffusion theory", time (t) for the mixing (mass transfer) is represented by the following equation:

$$t = deq^2/D$$

(wherein the definition of deq will be described hereinafter and D is mass diffusivity). Therefore, the smaller the channel width, the faster the time for mixing. Namely, when an equivalent diameter of a channel becomes $1/10$, time for mixing becomes $1/100$. Molecular transportation, molecular reaction, or molecular separation in a microscaled space can be conducted promptly due to spontaneous behavior of the molecules without using mechanical stirring.

For such reason, reaction speed under laminar flow of the microreactor according to the present invention is said to be higher than that under turbulent flow via a conventional macroreactor. In the case of the macroreactor, excessively high reaction speed is not necessarily advantageous for the control of reaction. However, in the case of the microreactor, since reaction is conducted basically at the flows, residence time inside the reactor can be controlled and temperature control is also facilitated as will be described later. Consequently, there is a high possibility that reaction selectivity will be noticeably improved. Further, since phase separation becomes facilitated, two-phase system reaction or separation refinement of products is enabled by using such characteristics.

Besides the above-described characteristics, since the microreactor has an extremely small reaction zone, the microreactor is also characterized by the ability to conduct high-temperature or high-pressure reactions safely by using metallic or ceramic materials. For example, with the microreactor, the oxidation reaction due to the generation of hydrogen peroxide from oxygen and hydrogen is possible, though this reaction is risky and almost impossible with the use of a typical reactor.

Reactivity of the microreactor is affected by the equivalent diameter of a flow passage (channel). The equivalent diameter is also referred to as a "nominal (right) diameter", which is the terminology used in the mechanical engineering field. Assuming that a circular pipe is equivalent to a pipe (channel in the present invention) having a suitably selected cross-sectional configuration, the diameter of the equivalent circular pipe is referred to as an equivalent diameter and defined as:

$$Deq = 4A/p$$

by using A: a cross section of a pipe and p: wet perimeter length (circumferential length) of the pipe. When applied to the circular pipe, the equivalent diameter is equal to the diameter of the circular pipe. The equivalent diameter is used to estimate the flow or thermal transfer characteristics of the pipe on the basis of data from the equivalent circular pipe, and then expresses the spatial scale (representative length) of the phenomenon. The equivalent diameter of an equilateral square pipe whose one side is a is defined as $deq = 4a^2/4a = a$, that of an equilateral triangle pipe whose one side is a is defined as $deq = a/\sqrt{3}$, and that of the flow whose passage height between parallel flat plates is h is defined as $deq = 2h$ (see "Mechanical Engineering Dictionary" edited by The Japan Society of Mechanical Engineers (1997), published by Maruzen Co., Ltd.)

The smaller the equivalent diameter of a channel, the larger the surface area (specified surface area) per unit of volume. Therefore, if the channel is microscaled as in the present invention, since the specified surface area becomes large, a thermal transfer efficiency via a vessel wall of the channel becomes remarkably high. Thermal transfer time (t) in the fluid that flows into the channel is represented by the following equation:

$$t = d_{eq}^2/\alpha \ (\alpha: \text{thermal diffusivity})$$

Therefore, the smaller the equivalent diameter, the shorter the thermal transfer time. Namely, when the equivalent diameter becomes 1/10, the thermal transfer time becomes 1/100. If the equivalent diameter is microscaled, the thermal transfer speed is extremely high.

In the method of producing microcapsules, the present invention is characterized in that the emulsification step i.e., one of the steps for producing microcapsules is conducted by a microreactor having channels whose equivalent diameter is no more than 1 mm.

Since the emulsification step in the method for producing microcapsules of the present invention uses the microreactor described above, microcapsules whose particle diameters are small and whose particle diameter distribution is limited can be produced. Further, since the aqueous phase used in the emulsification step is water or an aqueous solution of a low molecular surfactant and has a low viscosity, it is possible to increase a flow rate inside the microreactor and improve the efficiency with which the emulsion is prepared.

Further, in accordance with another aspect of the present invention, since an aqueous phase used in the emulsification step uses an aqueous solution of a water-soluble high polymer compound which has a relatively low viscosity of 40 cp or less and which is at least surface active, a flow rate inside the microreactor and the amount in which emulsion is treated can increase.

An oil phase and an aqueous phase are passed through the above-described channels each having an equivalent diameter of 1 mm or less to thereby form liquid films of the oil phase and the aqueous phase. These liquid films are passed through narrow passages to mix the oil phase and the aqueous phase and thereby form emulsion. Specifically, the liquid films are formed such that the oil phase liquid film and the aqueous phase liquid film are superposed. For example, as disclosed in FIG. 1 or FIG. 3 of WO00/62913 described above, a channel for an oil phase and a channel for an aqueous phase are alternately formed. The oil phase and the aqueous phase are passed through the respective channels. Accordingly, spatially separated liquid films are formed. The separated fluids are then combined with one another and passed through narrow passages. Consequently, the oil phase can be dispersed into the aqueous phase in the form of finer droplets. Examples of such microreactors are also disclosed in WO97/12665, WO97/17130, WO97/17133, WO97/28894, and WO98/33582.

In the emulsification of the present invention by using the microreactor, since the equivalent diameter of the channel is set to 1 mm or less, excellent emulsification can be conducted to obtain an emulsion which is formed of droplets each having a small particle diameter and a limited particle diameter distribution. The equivalent diameter of the channel is preferably 10 to 500 μm, and particularly preferably 20 to 300 μm. The length of the channel is not particularly limited, however, it is preferably 10 to 500 mm, and particularly preferably 10 to 500 mm. (In this specification, "to" represents a range including values written before and after "to" as a maximum value and a minimum value, respectively.)

Due to a numbering-up of the many channels used in the present invention as needed, a processing amount of the channels can be increased.

Further, the time the fluids stay inside the channels is generally no more than 1 hour, preferably no more than 10 minutes, and more preferably 1 second to 5 minutes.

The channels of the present invention are formed on a solid substrate by using a fine processing technology. Examples of materials used include: metal, silicone, teflon, glass, ceramics, or plastic. When heat resistance, pressure resistance, and solvent-resistance are required, preferable materials are silicone, teflon, glass, ceramics, or plastic, and a particularly preferable material is metal. Examples of metals include: nickel, aluminum, silver, gold, platinum, tantalum, stainless steel steel, hastelloy (Ni-Fe-based alloy), or titanium. However, stainless steel, hastelloy, or titanium which is corrosion-resistant is preferable.

In a conventional batch reactor, when an acid or the like is treated, a device having glass-lined metal (such as stainless steel) surface is used. However, in the microreactor also, glass can be coated on a metal surface. In accordance with the purpose, not only glass but also another metal or other materials can be coated on the metal surface. Also metal or glass can be coated on the surface of a material other than metal (e.g., ceramics).

The channels of the device (microreactor) according to the present invention can be subjected to a surface treatment in accordance with the purpose of the device. Particularly when an aqueous solution is controlled, since there is sometimes caused a problem that the glass or silicon absorbs the sample, the surface treatment is important. It is desirable to realize the fluid control in micro-size channels without incorporating therein movable parts for which a complicated producing process is required. For example, hydrophilic and hydrophobic regions may be formed inside the channels by the surface treatment so that the fluid can be controlled by making use of the difference between surface tensions acting on the interface between the hydrophilic and hydrophobic regions.

Typical examples of the fine processing technology for preparing a channel include: a LIGA technology using an X-ray lithography, a high-aspect ratio photolithography using EPON SU-8, a micro discharge processing method (μ-EDM), a high-aspect ratio processing method of silicone by Deep RIE, a Hot Emboss processing method, a light molding method, a laser processing method, an ion beam processing method, and a mechanical micro-cutting processing method using a micro tool made by a hard material such as diamond. These methods can be used singly or in combination. Preferable examples of the fine processing technologies include: the LIGA technology using the X-ray lithography, the high-aspect ratio photolithography using EPN SU-8, the micro discharge processing method (μ-EDM), and the mechanical micro-cutting processing method.

When the microreactor of the present invention is assembled, a bonding technology is often used. An ordinary bonding technology is largely divided into a solid phase bonding and a liquid phase bonding. Bonding methods in general use include: a solid phase bonding method such as a press-contact or diffusive bonding; and a liquid phase bonding method such as welding, eutectic bonding, soldering, or adhesion. Further, it is desired to assemble the microreactor by a highly accurate bonding method in which size accuracy can be maintained while preventing a fine structural body such as a channel from being destroyed due to quality deterioration or deformation of a material when heated at high temperature. Examples of technologies for such a method include: a silicone direct bonding, a positive electrode bonding, a surface activation bonding, a direct bonding using hydrogen bonding, a bonding using an aqueous solution of HF, an Au-Si eutectic bonding, or a void-free bonding.

In order to emulsify oil phase droplets into the aqueous phase by flowing the oil phase and aqueous phase solutions into the channels of the microreactor, a fluid control function is needed to introduce the oil phase and the aqueous phase into the channels. Specifically, since the behavior of the fluid in a fine region has properties different from those of a microscale, a control method appropriate for the microscale should be considered. A fluid control method is classified into a continuous flow system and a droplet (liquid plug) system according to the formation, while it is also classified into an electric driving system and a pressure driving system according to the driving force.

A more detailed description of these systems will be given hereinafter. The most widely used system as a formation for treating a fluid is the continuous flow system. When the flow is controlled in the continuous flow system, generally, the entire portion inside the channel of the microreactor is filled with a fluid, and the fluid as a whole is driven by a pressure source such as a syringe pump that is provided outside the channel. In this case, the continuous flow system has such a merit that the control system can be realized with a relatively simple set-up. However, this operation which requires replacing the solution is difficult. There is a difficulty in that there is a limited degree of freedom with respect to the structure of the system and there is an excessive amount of dead volume because a driving medium is the solution itself.

As a system which is different from the continuous flow system, there is provided the droplet (liquid plug) system. In this system, droplets partitioned by air are made to move inside the reactor or inside the channel leading to the reactor, and each of the droplets is driven by air pressure. During this process, a vent structure for allowing air between droplets and channel walls, or air between the droplets as necessary, to escape to the outside and a valve structure for maintaining pressure inside the branched channels independently from pressure at other portions must be provided inside the reactor system. Further, a pressure control system that is formed by a pressure source or a switching valve must be provided outside the reactor system in order to move the droplets by controlling the pressure difference. Thus, in the droplet system, the structure of the device or the configuration of the reactor becomes rather complicated, but the system can be more freely structured.

In general, as a driving system for controlling the fluid, the electric driving system in which an electroosmotic flow is generated due to the application of high voltage to both ends of a channel to thereby move a fluid and the pressure driving system in which pressure is applied to a fluid by a pressure source provided outside a channel to thereby move the fluid are widely used. For example, it is known that fluid behavior in these systems is different, and a flow rate profile in the cross section of a channel is flat in the electrical driving system, while it is hyperbolic in the pressure driving system in which the fluid flows fast at the center of the channel but slowly at the wall surface thereof. The electrical driving system is more appropriate than the pressure driving system for moving a sample plug without changing its configuration. In the case of the electrical driving system, since the inside of the channel must be filled with a fluid, this system must assume the form of the continuous flow system. However, since operation of the fluid is electrically controllable, a relatively complicated treatment is realized in which density slope with time is formed by sequentially changing the mixing ratio of two different solutions. In the case of the pressure driving system, the fluid can be controlled in spite of electric properties and there is no need to consider a secondary effect such as heat generation or electrolysis. As a result, this system hardly affects the substrate and thereby has a wide scope of application. Conversely, since a pressure source must be provided outside the channel, or operational response characteristics vary in accordance with the size of the dead volume of a pressure system, a complicated treatment must be automated.

A method which is used as a fluid control method is appropriately selected in accordance with the purpose. However, the pressure driving system in the continuous flowing system is preferable.

Temperature control of the microreactor can be performed by accommodating the entire device in a vessel whose temperature was controlled or by incorporating in the device a metal resistance wire, or a heater structure such as polysilicone. This metal resistance wire or the heater structure is used for heating, while a thermal cycling by natural cooling can be used for cooling. Temperature is sensed as described below. In the case of the metal resistance wire, another resistance wire which is the same as that of the heater is incorporated in the metal resistance wire to detect the temperature on the basis of the change of the resistance value. In the case of polysilicone, a thermocouple is used to detect the temperature. Further, the microreactor can be heated or cooled from the outside thereof by contacting a Pertier element with the microreactor. Selection of a method depends on the purpose of the microreactor or the material of the reactor body.

In order to increase a processing amount, it is possible to use an array-type reactor (mixer array) in which the above-described microreactors which are disposed parallel to each other were incorporated in the device.

Production of Microcapsules

A description of a method for producing microcapsules according to the present invention will be given hereinafter. In the method for producing the microcapsules of the present invention, after the emulsion was prepared from an oil phase and an aqueous phase as described above, a microcapsule wall material is made to react with the emulsion so that a microcapsule wall is formed. When the microcapsule wall is formed, if an isocyanate compound is used as the material for the microcapsule wall, after emulsification, the reaction for forming the microcapsule wall can be promoted by adding a polymerizable reaction catalyst of the isocyanate compound or by raising the temperature of emulsion.

Other than water, an aqueous solution of a low molecular surfactant can be used as the aqueous phase. A low molecular surfactant having a molecular weight of no more than 1000 is used without a particular limit. Further, a formalin condensed surfactant such as an aromatic sulfonate or an aromatic carbonate, or an alkylglucosido surfactant which are shown below can be used.

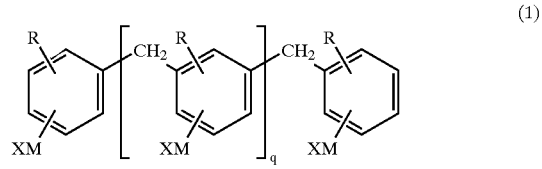

(1)

wherein R represents an alkyl group having 1 to 4 carbon atoms, X represents $SO_3^-$ or $COO^-$, M represents sodium or potassium, and q represents integers of 1 to 20.

The surfactant includes a structure in which an aromatic sulfonic acid or an aromatic carbonic acid such as a benzene sulfonic acid, a benzoic acid, a naphthalene sulfonic acid, or a naphthalene carbonic acid and its derivatives are formalin-condensed. A mean polymerization degree of 2 to 10 is preferable. The aromatic ring is preferably one to which an alkyl group or a substituted alkyl group having 1 to 4 carbon atoms was added. A plurality of surfactants can be mixed and used.

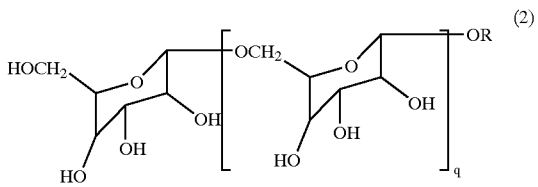

(2)

wherein n represents integers of 0 to 2, R represents an alkyl group having 4 to 18 carbon atoms whose chains can be straight or branched. i-butyl, n-hexyl, n-heptyl, n-octyl, 2-ethylhexyl, n-decyl, n-dodecyl, n-hexadecyl, n-octadecyl, and a branched octadecyl. In an industrial producing method, n is a composition in which 1 to 2 components are mixed and which contains monosaccharide glycoside of unit 0 as a main component, but such composition ratio of these components does not affect the effect of the present invention. Further, a combination of two or more different alkyl groups does not deteriorate the effect of the present invention.

The content of the surfactant in aqueous phase is 0.001 to 10%, and preferably 0.01 to 6%.

Another aspect of the present invention uses an aqueous solution which contains at least a surface active water-soluble high polymer compound for the aqueous phase. Examples of an at least surface active water-soluble high polymer compound include: polyvinyl alcohol and its modified substances, polyacrylic acid amide and its derivatives, ethylene-vinyl acetate copolymer, styrene-maleic anhydride copolymer, ethylene-maleic anhydride copolymer, isobutylene-maleic anhydride copolymer, polyvinylpyrolidone, ethylene-acrylic copolymer, vinyl acetate-acrylic copolymer, carboxyl methyl cellulose, methyl cellulose, casein, gelatin, starch derivatives, gum arabic, sodium alginate, and the like. Preferably, these water-soluble high polymers do not react with isocyanate compounds or have a relatively low reactivity therewith. For example, like gelatin, a water-soluble high polymer compound having a reactive amino group in the molecular chain thereof must be previously made nonreactive.

Viscosity of the aqueous phase must be no more than 40 cp, preferably no more than 20 cp, and more preferably no more than 10 cp. If the viscosity of the aqueous phase is more than 40 cp, pressure loss is caused inside the microreactor, thus making it impossible to obtain a desired processing amount. Accordingly, the viscosity must have no more than the above-described range.

In the above-described micro-encapsulation step, preferably, an aqueous solution containing at least a surface active water-soluble high polymer compound is further added to the emulsion, and afterwards, a material for a microcapsule wall is made to react with this mixture to thereby form the microcapsule wall. This aqueous solution is added to prevent the rare occurrence of aggregation of the microcapsule particles during the reaction. The aqueous solution to be added to the emulsion is appropriately added such that microcapsules dispersion after reaction has a solid matter density of 5 to 50%, and preferably 10 to 40%. Further, the aqueous phase to be added to an oil phase during the emulsification may be referred to as a "first aqueous phase", and the aqueous phase to be added to the emulsion during micro-encapsulation may be referred to as a "second aqueous phase".

In the same manner as described above, a water-soluble high polymer compound which is contained in a first aqueous phase is used for the at least surface active water-soluble high polymer compound to be added to a second aqueous phase.

Examples of the at least surface active water-soluble high polymer compound to be added to the second aqueous phase include: polyvinyl alcohol and its modified substances, polyacrylic amide and its derivatives, ethylene-vinyl acetate copolymer, styrene-maleic anhydride copolymer, ethylene-maleic anhydride copolymer, isobutylene-maleic anhydride copolymer; polyvinylpyrolidone, ethylene-acrylic copolymer, vinyl acetate-acrylic copolymer, carboxyl methyl cellulose, methyl cellulose, casein, gelatin, starch derivatives, gum arabic, sodium alginate, and the like. Preferably, these water-soluble high polymer compounds are nonreactive with isocyanate compounds or have a relatively low reactivity therewith. For example, like gelatin, a water-soluble polymer compound having a reactive amino group in the molecular chain thereof needs to be previously made nonreactive.

The concentration of the water-soluble high polymer compound contained in the second aqueous phase is 1 to 20%, and preferably 2 to 10%.

Production of Heat-Sensitive Recording Material

A description of a method for producing a heat-sensitive recording material by using the method for producing microcapsules as in the above-description will be given hereinafter. A heat-sensitive recording layer of the heat-sensitive recording material includes microcapsules for encapsulating therein a diazonium salt compound or an electron donating dye precursor as a color-forming component. Further, the heat-sensitive recording layer includes microcapsules as in the above-description, and a coupler or an electron accepting compound which is a color developer which develops a color in accordance with the color-forming component contained in the microcapsules. The color developer is emulsified or solidly dispersed into particles. The heat-sensitive recording layer is formed by coating on a support a mixture of microcapsules solution and a color-developing solution which are prepared as will be described later.

Since the heat-sensitive recording material of the present invention uses a microreactor during the emulsification step for producing the microcapsules, the material has a high color-forming density and little texture fogging when stored long term.

Microcapsules containing therein a diazonium salt compound or an electron donating dye precursor is produced by the steps of preparing an oil phase containing the diazonium salt compound or the electron donating dye precursor and a material for a microcapsule wall, and an aqueous solution; and emulsifying the oil phase and the aqueous phase by using a microreactor having channels whose equivalent diameters are no more than 1 mm.

Then, the resultant emulsion is micro-encapsulated to obtain microcapsules. During this process, as described above, it is preferable that the aqueous solution containing the water-soluble high polymer compound which is surface active is added to the emulsion, and then micro-encapsulated.

The oil phase is prepared by dissolving the diazonium salt compound or the electron donating dye precursor and the material for a microcapsule wall, and as necessary, various additives as well, in an organic solvent which is refractory or insoluble in water. Further, the aqueous phase uses only water, or is one in which various low molecular surfactants were dissolved in water.

Examples of the organic solvents include: low boiling point auxiliarly solvents such as acetate, methylenechloride, and cyclohexane and/or carboxylic acid esters such as ester phosphate, ester phthalate, acrylic ester, methacrylate, and the like, fatty acid amide, alkylated biphenyl, alkylated taphenyl, alkylated naphthalene, diallylethane, chlorinated paraffin, alcohols, phenols, ethers, monoolefins, and epoxies. Specific examples thereof include: high boiling point oils such as tricresyl phosphate, trioctyl phosphate, octyl diphenyl phosphate, tricylohexyl phosphate, dibutyl phthalate, dioctyl phthalate, dilaurate phthalate, dicyclohexyl phthalate, butyl olefinic acid, diethylene glycol benzoate, dioctyl sebacate, dibutyl sebacate, dioctyl adipic acid, trioctyl trimellitic acid, acetyl triethyl citric acid, maleic octyl, maleic dibutyl, isoamyl biphenyl, chlorinated paraffin, diisopropylnaphthalene, 1,1'-ditrilethane, 2,4-ditertiaryamylphenol, N,N-dibutyl-2-buthoxy-5-tertiaryoctylaniline, hydroxybenzoic acid 2-ethylhexylester, and polyethyleneglycol. However, among these, alcohols, ester phosphates, carboxilic acid esters, alkylated biphenyl, alkylated taphenyl, alkylated naphthalene, are diallylethane are preferable. Further, carbonization inhibitors such as hindered phenol, hindered amine, and the like can be added to the aforementioned high boiling point oils. Further, oil having unsaturated fatty acid such as α-methylstylenedimer is particularly desirable. As α-methylstylenedimer, MSD100 is available from Mitsui Toatsu Chemicals, Inc.

The aforementioned diazonium salt compound is a compound which is represented by the following equation, and forms a color through a coupling reaction with a coupler due to heating, and decomposes by light. The maximum absorption wavelength of such compound can be controlled in accordance with the position or type of a substituent group of Ar part.

(wherein Ar represents an aromatic part, and $X^-$ represents an acid anion.)

Specific examples of diazonium for forming salt include: 4-(p-tolylthio)-2,5-dibuthoxybenzenediazonium, 4-(4-chlorophenylthio)-2,5-dibutoxybenzenediazonium, 4-(N,N-dimethylamino) benzenediazonium, 4-(N,N-diethylamino) benzenediazonium, 4-(N,N-dipropylamino) benzenediazonium, 4-(N-methyl-N-benzylamino) benzenediazonium, 4-(N,N-dibenzylamino) benzenediazonium, 4-(N-ethyl-N-hydroxyethylamino) benzenediazonium, 4-(N,N-diethylamino)-3-methoxybenzenediazonium, 4-(N,N-dimethylamino)-2-methoxybenzenediazonium, 4-(N-benzoylamino) -2,5-diethoxybenzenidiazonium, 4-morpholino-2,5-dibuthoxybenzenediazonuim, 4-anilinobenzenediazonium, 4-[N-(4-methoxybenzoyl)amino]-2,5-diethoxybenzenediazonium, 4-pyrolidino-3-ethylbenzenediazonium, 4-[N-(1-methyl-2-(4-methoxyphenoxy)ethyl)-N-hexylamino]-2-hexyloxybenzenediazonium, 4-[N-(2-(4-methoxyphenoxy)ethyl)-N-hexylamino]-2-hexyloxybenzenediazonium, 2-(1-ethylpropyloxy) -4-[di-(di-n-buthylaminocarbonylmethyl)amino]benzenediazonium, 2-benzylsulfonyl-4-[N-methyl-N-(2-octanoyloxyethyl)]aminobenzenediazonium, and the like.

In the present invention, a coupler which is coupled with a diazo compound to form a dye can use any compound as long as it is coupled with a diazo compound and forms a dye in a basic atmosphere and/or a neutral atmosphere. All of the so-called 4-equivalent couplers for silver halide photographic light-sensitive materials can be used as the coupler. These couplers can be selected in accordance with the desired hue.

Examples of the couplers include: resorcinol, phloroglucin, 2,3-dihydroxynaphthalene, 2,3-dihydroxynaphthalene-6-sodium sulfonic acid, 1-hydroxy-2-naphthoic acid morpholino propyl amide, 2-hydroxy-3-naphthalenesulfonic acid sodium, 2-hydroxy-3-naphthalenesulfonic acid anilido, 2-hydroxy-3-naphthalenesulfonic acid morpholinopropylamide, 2-hydroxy-3-naphthalenesulfonic acid-2-ethylhexyloxypropylamide, 2-hydroxy-3-naphthalenesulfonic acid-2-ethylhexylamide, 5-acetoamide-1-naphthol, 1-hydroxy-8-acetoamidenaphthalene-3,6-disulfonic acid sodium, 1-hydroxy-8-acetoamidenaphthalene-3,6-disulphonic acid dianilide, 1,5-dihydroxynaphthalene, 2-hydroxy-3-naphthoic acid morpholinopropylamide, 2-hydroxy-3-naphthoic acid octyl amide, 2-hydroxy-3-naphtoic acid anilide, 5,5-dimethyl-1,3-cyclohexanedione, 1,3-cyclopentanedione, 5-(2-n-tetradecyloxyphenyl)-1,3-cyclohexanedione, 5-phenyl-4-methoxycarbonyl-1,3-cyclohexanedione, 5-(2,5-di-n-octyloxyphenyl)-1,3-cyclohexanedione, N,N'-dicyclohexyl barbituric acid, N,N'-di-n-dodecyl barbituric acid, N-n-octyl-N'-n-octadecyl barbituric acid, N-phenyl-N'-(2,5-di-n-octyloxyphenyl)barbituric acid, N-phenyl-N'-bis (octadecyloxycarbonylmethyl) barbituric acid, 1-phenyl-3-methyl-5-pyrazolone, 1-(2,4,6-trichlorophenyl)-3-anilino-5-pyrazolone, 1-(2,4,6-trichlorophenyl)-3-benzamide-5-pyrazolone, 6-hydroxy-4-methyl-3-cyano-1-(2-ethylhexyl)-2-pyridone, 2,4-bis-(benzoylacetoamide)toluene, 1,3-bis-(pivaloylacetoamidemethyl)benzene, benzoylacetonitrile, thenoylacetonitrile, acetoacetoanilide, benzoylacetoanilide, pivaloylacetoanilide, 2-chloro-5-(N-n-butylsulphamoyl)-1-pivaloylacetoamidebenzene, 1-(2-ethylhexloxypropyl)-3-cyano-4-methyl-6-hydroxy-1,2-dihydropyridine-2-on, 1-(dodecyloxypropyl)-3-acetyl-4-methyl-6-hydroxy-1,2-dihydropyridine-2-on, 1-(4-n-octyloxyphenyl)-3-tert-butyl-5-aminopyrozol, and the like. Details of such couplers are disclosed in Japanese Patent Application Laid-Open (JP-A) Nos. 4-201483, 7-223367, 7-223368, 7-323660, 5-278608, 5-297024, 6-18669, 6-18670, 7-316280, 8-027095, 8-027096, 8-030799, 8-12610, 8-132394, 8-358755, 8-358756, and 9-069990.

Examples of the electron donating dye precursor encapsulated in the microcapsules of the present invention include: a triallyl methane compound, a diphenyl methane compound, a thiadine compound, a xanthene compound, and a spiropyran compound. Especially, the triallyl methane compound and the xanthene compound have high color-forming density and are useful. Examples of these compounds include: 3,3-bis(p-dimethylaminophenyl)-6-dimethylaminophthalide (i.e., crystal violet lantone), 3,3-bis (p-dimethylamino)phthalide, 3-(p-dimethylaminophenyl)-3-(1,3-dimethylindole-3-il)phthalide, 3-(p-dimethylaminophenyl)-3-(2-methylindole-3-il)phthalide, 3-(o-methyl-p-diethylaminophenyl)-3-(2-methylindole-3-il) phthalide, 4,4'-bis (dimethylamino)benzhydrinbenzylether, N-halophenylleukoauramine, N-2,4,5-trichlorophenylleukoauramine, rhodamine-B-anilinoklactam, rhodamine (p-nitroanilino)lactam, rhodamine-B-(p-chloroanilino)lactam, 2-benzylamino-6-diethylaminofluoran, 2-anilino-6-diethylaminofluoran, 2-anilino-3-methyl-6-diethylaminofluoran, 2-anilino-3-methyl-6-cyclohexylmethylaminofluoran, 2-anilino-3-methyl-6-isoamylethylaminofluoran, 2-(o-chloroanilino)-6-diethylaminofluoran, 2-octylamino-6-diethylaminofluoran, 2-ethoxyethylamino-3-chloro-2-diethylaminofluoran, 2-anilino-3-chloro-6-diethylaminofluoran, benzoylleukomethyleneblue, p-nitrobenzylleukomethyleneblue, 3-methyl-spiro-dinaphtopyran, 3-ethyl- spiro-dinaphtopyran, 3,3'-dichloro-spiro-dinaphtapyran, 3-benzylspirodinaphtopyran, 3-propyl-spiro-dibenzopyran, and the like.

Examples of the electron accepting compound include: phenol derivatives, salicylic acid derivatives, and hydroxy benzoic acid esters. The bisphenols, hydroxy benzoic acid esters, and the like are particularly preferable. Some examples of these include: 2,2-bis(p-hydroxyphenyl) propane (i.e., bisphenol A), 4,4'-(p-phenylenediisopropylidene) diphenol (i.e., bisphenol P), 2,2-bis(p-hydroxyphenyl) pentane, 2,2-bis(p-hydroxyphenyl)ethane, 2,2-bis (p-hydroxyphenyl)butane, 2,2-bis (4'-hydroxy-3',5'-dychlorophenyl)propane, 1,1-(p-hydroxyphenyl) cyclohexane, 1,1-(p-hydroxyphenyl) propane, 1,1-(p-hydroxyphenyl)pentane, 1,1-(p-hydroxyphenhyl)-2-ethylhexane, 3,5-di($\alpha$-methylbenzyl)salicylic acid and its polyvalent metallic salts, 3,5-di(tert-butyl)salicylic acid and its polyvalent metallic salts, 3-$\alpha$,$\alpha$-dimethylbenzyl salicylic acid and its polyvalent metallic salts, p-hydroxy benzoic acid butyl, p-hydroxy benzoic acid benzyl, p-hydroxy benzoic acid-2-ethylhexyl, p-phenylphenol, p-cumyl phenol, and the like.

As a sensitizer, low melting point organic compounds moderately containing aromatic groups and polar groups in molecules are preferable. Examples of the sensitizers include: p-benzyloxy benzoic acid benzyl, $\alpha$-naphthyl benzyl ether, $\beta$-naphthyl benzyl ether, $\beta$-naphthoic acid phenyl ester, $\alpha$-hydroxy-$\beta$-naphthoic acid phenyl ester, $\beta$-naphthol-(p-chlorobenzyl)ether, 1,4-butanediolphenylether, 1,4-butanediol-p-methylphenylether, 1,4-butanediol-p-ethylphenylether, 1,4-butanediol-m-methylphenylether, 1-phenoxy-2-(p-trioxy)ethane, 1-phenoxy-2-(p-ethylphenoxy)ethane, 1-phenoxy-2-(p-chlorophenoxy) ethane, p-benzylbiphenyl, and the like.

As a material for a microcapsule wall, high polymer substances are preferable. Specific examples of the high polymer substances include: polyurethane resin, polyurea resin, polyamide resin, polyester resin, polycarbonate resin, aminoaldehyde resin, melamine resin, polystyrene resin, styrene-acrylate copolymer resin, styrene-methacrylate copolymer resin, gelatin, polyvinyl alcohol, and the like. Among these, a particularly preferable wall agent is the polyurethane and/or polyurea resin.

Microcapsules having a wall film formed of the polyurethane and/or polyurea resin is produced by the steps of mixing a microcapsule wall precursor such as polyvalent isocyanate with a core substance to be micro-encapsulated, emulsifying the resultant mixture in an aqueous solution of a water-soluble high polymer compound such as polyvinyl alcohol, and raising the temperature of the obtained emulsion thus allowing a high polymer forming reaction to occur at the interface between oil drops.

Some specific examples of the polyvalent isocyanate compounds include: isocyanates such as m-phenylenediisocyanate, p-phenylenediisocyanate, 2,6-tolylenediisocyanate, 2,4-tolylenediisocyanate, naphthalene-1,4-diisocyanate, diphenylmethane-4,4'-diisocyanate, 3,3'-diphenylmethane-4,4'-diisocyanate, xylene-1,4-diisocyanate, 4,4'-diphenylpropanediisocyanate, trimethylenediisocyanate, hexamethylenediisocyanate, propylene-1,2-diisocyanate, butylene-1,2-diisocyaate, cyclohexylene-1,2-diisocyanate, and cyclohexylene-1,4-diisocyanate; triisocyanates such as 4,4',4"-triphenylmethanetriisocyanate, and toluene-2,4,6-triisocyanate; tetraisocyanates such as 4,4'-dimethylphenylmethane-2,2', and 5,5'-tetraisocyanate; and isocyanateprepolymers such as an adduct of hexanemethylenediisocyanate and trimethylolpropane, an adduct of 2,4-tolylenediisocyanate and trimethylolpropane, an adduct of xylenediisocyanate and trimethylolpropane, and an adduct of tolylenediisocyanate and hexanetriol. Further, two or more compounds can be used together as necessary. Among these, a compound having three or more isocyanate groups in a molecule is particularly preferable.

The coupler or the electron accepting compound which is contained in the heat-sensitive recording layer of the heat-sensitive recording material may be emulsified or solidly dispersed into particles. However, it is preferable that the coupler is preferably solidly dispersed.

The heat-sensitive recording material of the present invention can be produced by the steps of mixing the microcapsules dispersion thus prepared and the dispersion of the coupler or the electron accepting compound, coating this mixture on the support, and forming the heat-sensitive recording layer.

EXAMPLES

The present invention will next be described by way of examples, which should not be construed as limiting the invention. In the following description, unless specified otherwise, part represents part by mass, and % represents % by mass.

Example 1

Preparation of Diazonium Salt Compound-containing Microcapsules

Preparation of an Oil Phase

A diazonium salt compound (4.4 parts) which has a maximum absorption wavelength of 420 nm when decomposed and which is represented by the following structural formula were dissolved in ethyl acetate (16.4 parts). This and isopropylbiphenyl (9.8 parts) which is a high boiling point solvent were heated and uniformly mixed. To the thus-obtained solution was added a 50% aqueous solution of ethyl acetate (TAKENATE D119N manufactured by Takeda Chemical Industries, Ltd.) (18 parts) containing a mixture of an adduct of xylenediisocyanate/trimethylolpropane and an adduct of xylenediisocyanate/bisphenol A as a material for a microcapsule wall. The resultant mixture was homogeneously stirred.

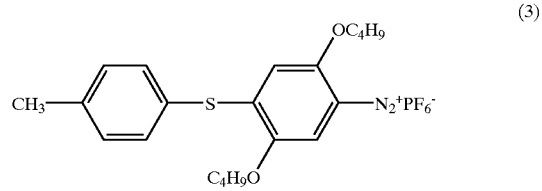

(3)

Preparation of a First Aqueous Phase

Water (50 parts) was used as a first aqueous oil phase.

Emulsification

The oil phase and the first aqueous solution were supplied into the inlet portion of a microreactor (SINGLE MIXER manufactured by IMM Corp., the equivalent diameter:80 μm) at a constant flow rate (1L/hr) at room temperature through use of a syringe pump, to thereby obtain a desired emulsion.

Micro-Encapsulation

The resultant emulsion was added to water (second aqueous phase) (40 parts) which was maintained at 40° C. while stirring. This was reacted with isocyanate to thereby obtain microcapsules.

Example 2

Microcapsules were obtained in a manner similar to those of Example 1 except that in place of the first aqueous phase in Example 1, a first aqueous phase in which a 50% aqueous solution of an alkylglucoside surfactant (Scraph AG-8 manufactured by Nihon Seika Co., Ltd.) (1.5 parts) was added to water (50 parts) was used.

Example 3

Example 1 except that in place of the first aqueous phase in Example 1, a first aqueous phase in which a 10% aqueous solution of dodecylbenzene sulfonic acid soda (7.5 parts) was added to water (50 parts) was used.

Example 4

Microcapsules were obtained in a manner similar to those of Example 1 except that in place of the second aqueous phase in Example 1, as a second aqueous phase, an aqueous solution of phthalated gelatin (40 parts) at a concentration of 8% was used.

Example 5

Microcapsules were obtained in a manner similar to those of Example 1 except that in place of the second aqueous phase in Example 1, as a second aqueous phase, an aqueous solution of polyvinyl alcohol (PVA217 manufactured by Kuraray Co., Ltd.) (40 parts) at a concentration of 2% was used.

Example 6

Microcapsules were obtained in a manner similar to those of Example 1 except that in place of the single mixer in Example 1, a mixer array (manufactured by IMM Corp., the equivalent diameter:80 μm) was used.

Example 7

Preparation of Diazonium Salt Compound-containing Microcapsules)

Preparation of an Oil Phase

An oil phase was prepared in a manner similar to those of Example 1.

Preparation of a First Aqueous Phase

An aqueous solution of polyvinyl alcohol having a viscosity of 10 cp (containing 2% of polyvinyl alcohol (PVA 217 manufactured by Kuraray Co., Ltd.))(50 parts) was used as a first aqueous solution. The viscosity at the temperature of 25° C. was measured by means of B-type viscometer.

Emulsification

The oil phase and the first aqueous solution were supplied into the inlet portion of a microreactor (SINGLE MIXER manufactured by IMM Corp., the equivalent diameter:80 μm) at a constant flow rate (1L/hr) at room temperature through use of a syringe pump, to thereby obtain a desired emulsion.

Micro-Encapsulation

The resultant emulsion was added to water (second aqueous phase) (40 parts) which was maintained at 40° C. while stirring. This was reacted with isocyanate to thereby obtain microcapsules.

Example 8

Microcapsules were obtained in a manner similar to that of Example 7 except that in place of the first aqueous phase in Example 7, as a first aqueous phase, an aqueous solution of polyvinyl alcohol (PVA217 manufactured by Kuraray Co., Ltd.) (50 parts) having a viscosity of 5 cp was used.

Example 9

Microcapsules were obtained in a manner similar to that of Example 7 except that in place of the second aqueous phase (water)(40 parts), an aqueous solution of polyvinyl alcohol containing 8% of polyvinyl alcohol (PVA217 manufactured by Kuraray Co., Ltd.) (40 parts) was used. Example 10

Microcapsules were obtained in a manner similar to that of Example 7 except that in place of the second aqueous phase (water) (40 parts) in Example 7, an 8% aqueous solution of polyvinyl alcohol (PVA217 manufactured by Kuraray Co., Ltd.) (40 parts) and a 50% of aqueous solution of an alkygulcoside surfactant (Scraph AG-8 manufactured by Nihon Seika Co., Ltd.) (1.5 parts) were used.

Example 11

Microcapsules were obtained in a manner similar to that of Example 7 except that as the first aqueous phase to be mixed with the oil phase in Example 7, a 2% aqueous solution of phthalated gelatin whose viscosity is 10 cp was used. The viscosity was measured by means of a B-type viscometer.

Example 12

Microcapsules were obtained in a manner similar to those of Example 7 except that in place of the single mixer described in Example 7, a mixer array (manufactured by IMM Corp., the equivalent diameter: 80 μm) was used.

In the method for producing microcapsules, the above-described microreactor is used during the emulsification step. Therefore, microcapsules whose particle diameters are small and whose particle diameter distribution is limited can be produced. An aqueous phase which is used in the emulsification step is water or an aqueous solution of a low molecular surfactant having a low viscosity. As a result, a flow rate inside the microreactor can be increased to thereby prepare an emulsion more efficiently.

Further, in accordance with another aspect of the present invention, since aqueous phase in the emulsification step uses an aqueous solution of a water-soluble high polymer compound which has a relatively low viscosity of no more than 40 cp and which is at least surface active, both a flow rate inside the microreactor and a processing amount during the emulsification can be increased.

Moreover, since the method for producing microcapsules uses a microreactor during the emulsification step, the present invention can provide a heat-sensitive recording material whose color forming density is high and in which textile fogging due to long-term storage can be reduced.

What is claimed is:

1. A method for producing microcapsules comprising the steps of:
   (1) preparing an emulsion from an oil phase that contains at least a material to be micro-encapsulated and a microcapsule wall material, and an aqueous phase; and
   (2) carrying out micro-encapsulation by using the emulsion, wherein the step of preparing the emulsion is conducted by means of a microreactor having channels whose equivalent diameters are no more than 1 mm.

2. The method of claim 1, wherein the aqueous phase is water.

3. The method of claim 1, wherein the aqueous phase is an aqueous solution containing a low molecular surfactant.

4. The method of claim 1, wherein, in the micro-encapsulation step, micro-encapsulation is conducted by using a mixture in which an aqueous solution containing at least a surface active water-soluble high polymer compound was further added to the emulsion.

5. The method of claim 4, wherein the oil phase includes a diazonium salt compound or an electron donating dye precursor, and the microcapsule wall material.

6. The method of claim 4, wherein the material for the microcapsule wall contains a polyvalent isocyanate compound.

7. The method of claim 1, wherein the oil phase contains a diazonium salt compound or an electron donating dye precursor and the microcapsule wall material.

8. A heat-sensitive recording material having a heat-sensitive recording layer on a support, wherein the heat-sensitive recording layer contains microcapsules obtained by the method according to claim 7, and a color-developing agent.

9. The method of claim 1, wherein the microcapsule wall material contains a polyvalent isocyanate compound.

10. A heat-sensitive recording material having a heat-sensitive recording layer on a support, wherein the heat-sensitive recording layer contains microcapsules obtained by the method according to claim 9, and a color-developing agent.

11. A method for producing microcapsules, comprising the steps of
   (1) preparing an emulsion from an oil phase that contains at least a material to be micro-encapsulated and a microcapsule wall material, and an aqueous phase; and
   (2) carrying out micro-encapsulation by using the emulsion, wherein the aqueous phase contains at least a surface active water-soluble high polymer compound and has a viscosity of no more than 40 cp, and the step of preparing the emulsion is conducted by means of a microreactor having channels whose equivalent diameters are no more than 1 mm.

12. The method of claim 11, wherein, in the micro-encapsulation step, micro-encapsulation is conducted by using a mixture in which an aqueous solution containing at least a surface active water-soluble high polymer compound was further added to the emulsion.

13. The method of claim 12, wherein the oil phase contains a diazonium salt compound or an electron donating dye precursor, and a microcapsule wall material.

14. A heat-sensitive recording material having a heat-sensitive recording layer on a support, wherein the heat-sensitive recording layer contains microcapsules obtained by the method according to claim 13, and a color-developing agent.

15. The method of claim 12, wherein the microcapsule wall material contains a polyvalent isocyanate compound.

16. A heat-sensitive recording material having a heat-sensitive recording layer on a support, wherein the heat-sensitive recording layer contains microcapsules obtained by the method according to claim 15, and a color-developing agent.

17. The method of claim 11, wherein the oil phase contains a diazonium salt compound or an electron donating dye precursor, and a microcapsule wall material.

18. A heat-sensitive recording material having a heat-sensitive recording layer on a support, wherein the heat-sensitive recording layer contains microcapsules obtained by the method according to claim 17, and a color-developing agent.

19. The method of claim 11, wherein the microcapsule wall material contains a polyvalent isocyanate compound.

20. A heat-sensitive recording material having a heat-sensitive recording layer on a support, wherein the heat-sensitive recording layer contains microcapsules obtained by the method according to claim 19, and a color-developing agent.

* * * * *